Jan. 20, 1931.　　　L. FERRY　　　1,789,357
SAW GUARD
Filed Oct. 9, 1929
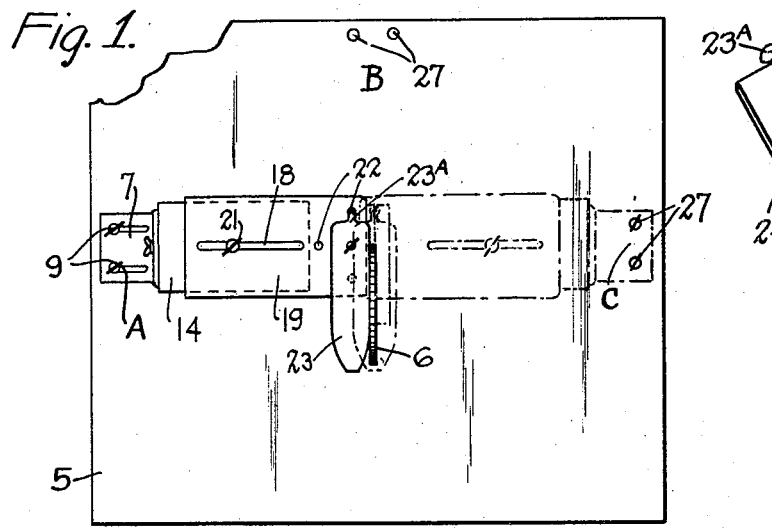
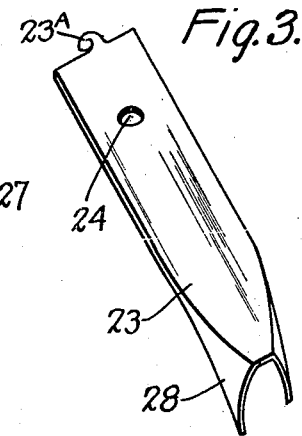
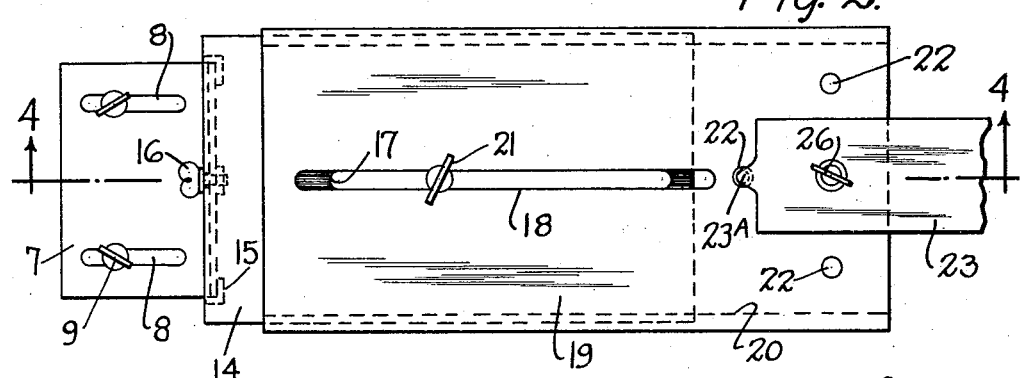
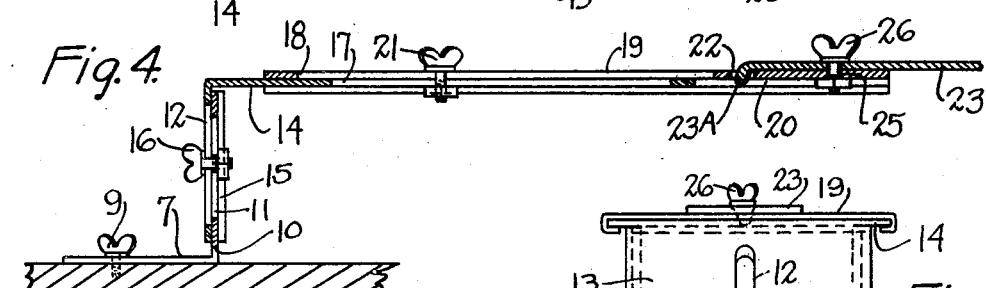
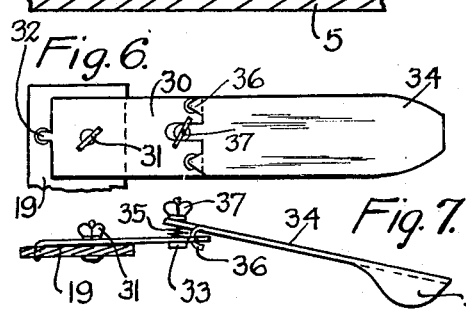
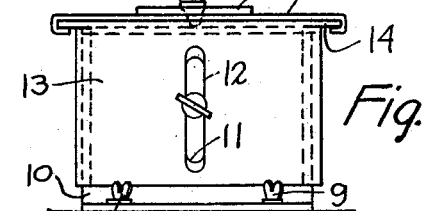
Inventor
LOUIS FERRY
By His Attorney
John J. Lynch Patented Jan. 20, 1931

1,789,357

UNITED STATES PATENT OFFICE

LOUIS FERRY, OF CLIFTON, NEW JERSEY

SAW GUARD

Application filed October 9, 1929. Serial No. 398,462.

This invention relates to saw guards and in particular to one which may be moved to a plurality of positions to provide a maximum amount of protection.

One of the objections encountered in the use of various saw guards is that they do not permit the carrying out of certain cutting operations on the saw and at the same time give the protection that is needed to the hands and fingers of the operator during the various cutting operations.

It is one of the most important objects of my invention therefore to provide a saw guard which may be mounted in a number of different positions on top of the saw table and the parts of which are so adjusted that the saw will be protected during the various cutting operations such as rabbeting of long work held vertically, longitudinal groovings or transverse cutting operations.

A still further object of my invention is to provide a saw guard having a minimum number of parts and so constructed that it will be strong and durable and will withstand abuse and hard usage that are encountered in saw mill operations.

To enable others skilled in the arts to fully comprehend the underlying features of my invention that they may embody the same in the various modifications in structure and relation contemplated, a drawing depicting a preferred form has been annexed as a part of this disclosure and in such drawing similar reference characters denote corresponding parts throughout all the views, of which;

Figure 1 is a plan view of a saw table upon which is mounted my improved saw guard.

Figure 2 is an enlarged top plan view of the new guard illustrated in Figure 1, the guard arm being turned at an angle to the position in which it is illustrated in Figure 1.

Figure 3 is a view in perspective of the saw guard arm as used in connection with my guard device.

Figure 4 is a section taken on the line 4—4 of Figure 2 and illustrates the adjustability of the various parts of the saw guard.

Figure 5 is a view in elevation of the rear end of the saw guard.

Figure 6 is a top plan view of a modified form of my invention, and

Figure 7 is a side view in elevation thereof.

Referring to the drawings in detail, 5 indicates the top of a saw table through which extends in the usual manner, the cutting saw 6 which is used for rabbeting, grooving or cutting operations of any nature desired. In the guarding of the saw 6, one of the main considerations is to prevent the operator from putting the hands low enough on the work or holding the work at such a position that there is danger of the saw cutting the fingers or hands and in order to obviate these dangers, I have provided a new guard which may be used at a plurality of positions and which can be adjusted so that any kind of work may be accommodated without interfering with the guard and at the same time the hands of the operator will be protected.

My saw guard consists of the base plate 7 provided with the grooves 8 adjacent the opposite sides thereof through which is arranged to pass the shanks of wing screws 9 so that the base plate 7 may be secured to the table top 5 in any adjusted position desired. The base plate 7 is bent to provide a vertical portion 10 which is slotted centrally as at 11, the slot coinciding with a slot 12 formed in the downwardly extending portion 13 of the guard arm 14. The downwardly extending portion 13 of the guard arm 14 is provided with the overturned flanges 15 which pass about the side edges of the vertical portion 10 of the base plate 7, the part 10 and 12 being adjustably secured together through the medium of a winged bolt 16 which passes through the slots 11 and 12.

The guard arm 14 in its horizontal portion is provided with the slot 17 which in turn coincides with a slot 18 formed in the guard slide 19. This guard slide 19 is provided along its opposite edges with an overturned flange 20 so that the slide is guided in a sliding movement along the guard arm 14 and through the medium of a wing bolt 21 which passes through the slots 17 and 18 is held in any adjusted position relatively to the guard arm 14.

The outer end of the guard slide 19 is provided with a plurality of openings 22 into any of which is arranged to be positioned the downwardly protruding tongue 23A formed on the inner end of the guard strip 23. This guard strip is relatively narrower than the guard slide 19 and is provided with an opening 24 which is in register with an opening 25 formed in the end of the guard slide 19. Through these two openings 24 and 25 passes a wing bolt 26 through the medium of which the guard strip 23 may be moved to any one of a number of adjusted positions depending upon the work to be done and depending upon the position in which the saw guard as a whole is positioned relatively to the saw table. The tongue 23A is formed by extending the metal of the guard strip and bending it to provide an extension which fits into any one of the openings 22 when the guard strip has been positioned on the slide 19.

As indicated in Figure 1 the guard is positioned at the left hand side of the saw table and is retained in this position through the medium of the winged screws 9 which enter threaded openings provided in the table top 5 this position of the saw guard being indicated as A. At the right hand side of the table the openings 27 are employed through the medium of which the guard may be positioned at the right hand side of the table or in what would be indicated as position C. The rear edge of the table is also provided with like openings 27 and constitutes what would be deemed position B. At the position A the saw would be in a measure guarded in rabbeting the long ends of work held vertically or for grooving work longitudinally and as will be noticed the guard is in such a position that the hands and fingers of the operator in grasping a piece of work which must be stood on end will invariably grasp the work above the guard strip 23 with the result that his hands and fingers will be out of the path of the saw and injury will be prevented. At the position B the saw is guarded in transverse cutting operation where the cut does not sever the wood as in grooving and in using the guard at this position the guard strip 23 will be in the position indicated in Figure 2. In the position C all longitudinal grooving or rabbeting except that done when the work is held in vertical position is carried out in safety the guard strip 23 being reversed from the position shown in Figure 1 when the guard itself is placed at position C so that it fully overlies the saw.

It will be noted that the guard strip 23, has its forward side edges turned down as at 28 to more completely guard the saw.

It is evident therefore, that I have provided a safety saw guard which may be placed in a plurality of different positions to guard the saw depending upon the operation to be carried out, the guard being equally effective in rabbeting the ends of long work held vertically, grooving longitudinally, transverse cutting operations and longitudinal rabbeting as well as other general cutting operations that may be necessary.

It is evident also that I have provided a saw guard which has few parts and which are adjustably associated so that the guard will fit a table of various dimensions and may be adjusted to provide a long overhang of the guard arm and slide and may be adjusted relatively to the top of the table in a vertical position so that it will afford protection to a saw protruding from the table at any distance.

In order that greater protection may be afforded, I have shown a modified form of guard arm or guard strip which consists of a strip holder 30 which, through the medium of the wing nut 31 is arranged to be secured to the guard slide 19 in the same manner as the guard strip 23 secured to said slide so that it may be swung around to any one of a number of positions, a lip 32 being provided thereon for engaging any of the openings 22 formed in the guard slide 19. The end of the strip holder 30 is provided with an opening through which passes the wing bolt 33, the bolt passing through a suitable opening in a guard strip 34 and carrying between the end of the guard strip 34 and the strip holder 30, a suitable compression spring 35 so that the guard strip 34 at its free end is normally thrown downward by the action of the spring 35. In order that the guard arm 34 may have suitable pivotal movement and may be properly retained in position, the corners thereof are extended to provide the hooks 36 which enter suitable openings provided for that purpose in the outer end of the strip holder 30. Operation of the wing nut 37 on the bolt 33 adjusts the angular position of the guard 34, whose outer ends are turned down as at 38 in the same manner as the guard strip illustrated in Figure 3.

In the forms of my invention shown in Figures 6 and 7, it is evident that the guard strip may be thrown down very close to the saw and its extended portion 38 will cause it to ride up over the edge of a piece of material that is being passed over the wood with the result that the fingers of the operator will be carefully guarded because the saw will be closely covered at all times by the proper adjustment of the guard strip.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A saw guard comprising a base plate, a guard arm, means for adjustably connecting the arm and plate to permit vertical adjustment of the arm, a guard slide, means connecting the slide and arm to permit longitudinal adjustment therebetween, and a saw guard strip carried by said slide.

2. A saw guard comprising a base plate, means for adjustably securing the plate to a saw table, a guard arm, means for adjustably connecting the arm and plate to permit vertical adjustment of the arm, a guard slide, means connecting the slide and arm to permit longitudinal adjustment therebetween, and a self adjusting saw guard strip carried by the slide.

3. A saw guard comprising a base plate, a guard arm, means for adjustably connecting the arm and plate to permit vertical adjustment of the arm, a guard slide having openings therein, means connecting the slide and arm to permit longitudinal adjustment therebetween, a saw guard strip carried by the slide, and means on the strip engaging said slide opening to permit adjustment of the strip to various positions.

4. A saw guard comprising a base plate, a guard arm, means for adjustably connecting the arm and plate to permit vertical adjustment of the arm, a guard slide having openings therein, means connecting the slide and arm to permit longitudinal adjustment therebetween, a saw guard strip holder carried by the slide, and a guard strip yieldably secured to said holder.

In testimony whereof I have signed my name to this specification this 17th day of September, 1929.

LOUIS FERRY. [L. S.]